United States Patent Office 2,798,861
Patented July 9, 1957

2,798,861

COATING COMPOSITION COMPRISING A DIPHENYLOLPROPANE - EPICHLOROHYDRIN CONDENSATION PRODUCT AND A STYRENE-ACRYLIC ESTER-ACRYLIC ACID COPOLYMER

Gordon Hart Segall and James Lorne Cameron, McMasterville, Quebec, Canada, assignors to Canadian Industries (1954) Limited, Montreal, Quebec, Canada, a corporation of Canada No Drawing. Application February 14, 1955, Serial No. 488,144

4 Claims. (Cl. 260—45.5)

This invention relates to new coating compositions. More particularly, it relates to new coating compositions based on copolymers of styrene, an acrylic acid and lower alkyl esters of acrylic acid.

In United States Patent No. 2,604,464, dated July 22, 1952, in the names of G. H. Segall and J. F. C. Dixon, there are described and claimed coating compositions adapted for being hardened into infusible and solvent-insoluble films on baking at a temperature of about 150° after application, the said coating compositions comprising essentially a linear thermoplastic copolymer of more than 50 parts of styrene and at least 5 parts of acrylic acid and at least 15 parts of a lower alkyl ester of acrylic acid, the total parts being 100, in admixture with one mol of diphenylolpropane diglycidyl ether for each two free carboxylic acid groups of the copolymer and at least 0.5%, by weight of the copolymer, of a catalytic amine or quaternary ammonium compound.

These coating compositions are referred to in United States Patent No. 2,662,870, dated December 15, 1953, in the name of O. C. W. Allenby, and are said to be objectionable from the standpoints of odour and outdoor colour retention. The latter patent accordingly proposes the replacement of the aforesaid catalytic amine or quaternary ammonium compound by vinyl pyridine which is copolymerized with the styrene, acrylic acid and lower alkyl acrylate and hence becomes an integral part of the copolymer while acting as catalyst for the subsequent baking operation. The patent also proposes to replace, advantageously, diphenylolpropane diglycidyl ether by low molecular weight polymeric condensation products of diphenylolpropane with epichlorohydrin, the said condensation products having an epoxide

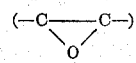

content of at least 7.5% by weight and a melting point not exceeding 75° C. and a Gardner viscosity not exceeding 1.65 poises as 40% solutions in ethylene glycol monobutyl ether, and being used in the same proportion as diphenylolpropane diglycidyl ether, i. e. in such proportion that one expoxide group is present for each free carboxylic acid group of the styrene copolymer.

The coating compositions of United States Patent No. 2,662,870, although superior to those of United States Patent No. 2,604,464, are nevertheless still objectionable in that they yield, upon baking, protective coating films which lack the soap resistance and extreme flexibility required for certain applications. Furthermore, they require too great an amount of polyepoxide, which renders them somewhat uneconomical, and they are limited as to the amounts of styrene and lower alkyl acrylate which can be used therein.

It has now been found that if in the coating compositions of United States Patent No. 2,604,464, the diphenylolpropane diglycidyl ether is replaced by the epoxy polymeric condensation products disclosed in United States Patent No. 2,662,870 and if certain specific catalytic quaternary ammonium compounds are used, compositions are obtained which are superior to those of United States Patent No. 2,604,464 to the same extent as are the compositions of United States Patent No. 2,662,870 and which are also unexpectedly superior to the compositions of United States Patent No. 2,662,870 from the standpoint of flexibility and soap resistance.

It has also been found that by using the aforesaid epoxy polymeric condensation products together with the aforesaid specific catalytic quaternary ammonium compounds, it is possible to reduce the amount of polyepoxide in the coating compositions without affecting the properties of the protective films obtained by the baking of said compositions, and it is also possible to vary the proportions of styrene and lower alkyl acrylate therein present within wider limits and thus produce a wider range of protective films for specific purposes.

It is therefore an object of this invention to provide new coating compositions.

Another object of this invention is to provide new coating compositions based on copolymers of styrene, an acrylic acid and lower alkyl esters of acrylic acid.

A further object of this invention is to provide coating compositions as hereinbefore defined which are superior to prior art compositions of the same general type from the standpoint of cost and from the standpoint of the properties of the protective films obtained therefrom.

Additional objects of the invention will become apparent hereinafter.

The new coating compositions of this invention comprise essentially a linear thermoplastic copolymer of from 15 to 80 parts of styrene and from 15 to 80 parts of a lower alkyl ester of acrylic acid and from 5 to 10 parts of an acrylic acid, the total parts being 100, in admixture with from 15% to 55%, by weight of the copolymer, of a low molecular weight polymeric condensation product of diphenylolpropane with epichlorohydrin, said condensation product having an epoxide content of at least 7.5% by weight and a melting point not exceeding 75° C. and a Gardner viscosity not exceeding 1.65 poises as a 40% solution in ethylene glycol monobutyl ether, and from 0.5% to 2.0%, by weight of the copolymer and condensation product, of a quaternary ammonium hydroxide having at least one alkyl group of from 12 to 18 carbon atoms attached to the nitrogen atom. These coating compositions yield, upon baking at a temperature of from 100° to 150° C., protective coating films having properties superior to those of the films obtained from prior art coating compositions of the same general type, such as the compositions disclosed in United States Patent Nos. 2,604,464 and 2,662,870.

The details and manner of practising this invention will be apparent by reference to the following specific examples wherein the parts given are by weight, it being understood that these examples are merely illustrative embodiments of the invention and that the scope of the invention is not limited thereto.

Example I 72 parts of styrene, 20 parts of ethyl acrylate and 8 parts of acrylic acid were dissolved in 50 parts of xylene together with 1 part of benzoyl peroxide and 1 part of tert-butyl hydroperoxide, and the solution was refluxed for three hours. The resultant thermoplastic copolymer solution was then diluted with 25 parts of xylene and 25 parts of butanol and, after mixing with titanium dioxide pigment, there were added thereto 35 parts of a polymeric diphenylolpropane/epichlorohydrin condensation product, said condensation product having an epoxide content of 7.5–8.5% by weight and a melting point of 65°–75° C. and a Gardner viscosity of 0.85–1.65 poises as a 40% solution in ethylene glycol monobutyl ether, and 0.67 part of dodecyl trimethyl ammonium hydroxide. The total non-volatile material of the solution was then adjusted to 50% by the addition of equal parts of butanol and xylene and a film drawn on a steel panel from the solution. After baking for 30 minutes at 150° C., this film was infusible, acetone-insoluble, soap-resistant and it displayed an excellent adhesion and flexibility on a bend test.

*Example II*

The procedure of Example I was repeated using 42 parts of styrene, 50 parts of ethyl acrylate and 8 parts of acrylic acid. The protective coating film thus obtained had a high gloss and coin scratch toughness, an excellent flexibility and a good soap, grease, stain and acetone resistance.

*Example III*

An acetone-resistant highly flexible film was obtained by applying the procedure of Example I to 32 parts of styrene, 60 parts of ethyl acrylate, 8 parts of acrylic acid, using 15 parts of diphenylolpropane/epichlorohydrin condensation product and 0.57 part of dodecyl trimethyl ammonium hydroxide.

*Example IV*

To 62 parts of styrene, 30 parts of methyl acrylate, 8 parts of acrylic acid, 1 part of benzoyl peroxide and 1 part of tert-butyl hydroperoxide, there were added 50 parts of xylene and the solution was refluxed for three hours. The resultant thermoplastic copolymer solution was then diluted with 25 parts of xylene and 25 parts of butanol and, after mixing with titanium dioxide pigment, there were added thereto 55 parts of the diphenylolpropane/epichlorohydrin condensation product disclosed in Example I and 0.77 part of dodecyl trimethyl ammonium hydroxide. The total non-volatile material of the solution was then adjusted to 50% by the addition of equal parts of butanol and xylene and a film drawn on a steel panel from the solution. After baking for 30 minutes at 150° C., this film was infusible, acetone-resistant and soap-resistant, and it displayed an excellent flexibility on a bend test.

*Example V*

The procedure of Example IV was applied with identical results to 52 parts of shyrene, 40 parts of butyl acrylate and 8 parts of acrylic acid.

The above-detailed examples illustrate certain embodiments of the invention wherein there are prepared and baked after application coating compositions containing specific styrene/lower alkyl acrylate/acrylic acid copolymers of a specific composition as well as specific catalytic quaternary ammonium bases. The present invention, however, is not restricted to such specific ingredients.

The lower alkyl esters of acrylic acid which can be copolymerized with the styrene and acrylic acid include, in addition to those shown in the examples, such esters as propyl acrylate, isopropyl acrylate, isobutyl acrylate, etc. Acrylic acid can also be replaced by alkyl-substituted acrylic acids such as methacrylic acid.

Similarly, the quaternary ammonium bases include all such bases having at least one alkyl group of from 12 to 18 carbon atoms attached to the nitrogen atom, e. g. octadecyl, hexadecyl, tetradecyl and doceyl benzyl dimethyl ammonium hydroxides, dioctadecyl dimethyl ammonium hydroxide, etc. They may be present in the coating compositions in amounts ranging from 0.5 to 2.0% by weight of the copolymer and condensation product.

As previously mentioned, the linear thermoplastic copolymers may contain from 15 to 80 parts of styrene, from 15 to 80 parts of lower alkyl acrylate and from 5 to 10 parts of an acrylic acid, the total parts being 100, and the epoxy condensation products may be present in the coating compositions in amount ranging from 15 to 55% by weight of the copolymers.

The said polymeric epoxy condensation products must be of low molecular weight and hence of low viscosity and melting point and of high epoxide content, as hereinbefore mentioned. When diphenylolpropane is condensed with epichlorohydrin, the following molecular units are formed:

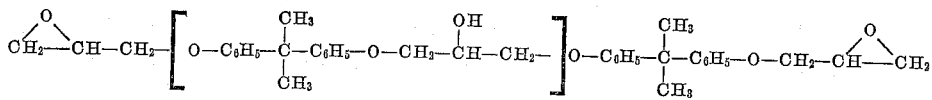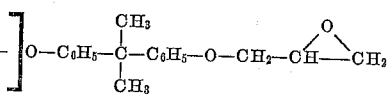

The formation of low molecular weight condensation products means formation of a plurality of short molecular units whereas high molecular weight condensation products involve molecular units of great length. Accordingly, low molecular weight condensation products possess a greater number of free epoxide groups which are available for cross-linking the linear copolymers through the free carboxylic acid groups thereof. Low molecular weight condensation products also have a lower melting point and a lower viscosity and hence are readily missible with the linear copolymers. For the purpose of this invention, the condensation products must have a low molecular weight such as to possess at least 7.5% by weight of free epoxide groups, a melting point not exceeding 75° C. and a Gardner viscosity not exceeding 1.65 poises as 40% solutions in ethylene glycol monobutyl ether.

For the preparation of the styrene/lower alkyl acrylate/acrylic acid copolymers, any of the well-known processes for the copolymerization of styrene can be used.

In the foregoing examples, titanium dioxide is used as the pigment constituent of the coating compositions. Other pigments may also be used either alone or in admixture to produce enamels of various colours. These enamels are, however, of particular value when produced with white pigments since they are highly resistant to yellowing on baking.

What we claim is:

1. A coating composition comprising essentially a linear thermoplastic copolymer of from 15 to 80 parts of styrene and from 15 to 80 parts of a lower alkyl ester of acrylic acid and from 5 to 10 parts of an acid selected from the group consisting of acrylic and methacrylic acids, the total parts being 100, in admixture with from 15% to 55%, by weight of said copolymer, of a low molecular weight polymeric condensation product of diphenylolpropane with epichlorohydrin, said condensation product having an epoxide content of at least 7.5% by weight and a melting point not exceeding 75° C. and a Gardner viscosity not exceeding 1.65 poises as a 40% solution in ethylene glycol monobutyl ether, and from 0.5% to 2.0%, by weight of said copolymer and condensation product jointly, of a quaternary ammonium hydroxide having at least one alkyl group of from 12 to 18 carbon atoms attached to its nitrogen atom.

2. A coating composition comprising essentially a linear thermoplastic copolymer of from 15 to 80 parts of styrene and from 15 to 80 parts of ethyl acrylate and from 5 to 10 parts of acrylic acid, the total parts being 100, in admixture with from 15% to 55%, by weight of said copolymer, of a low molecular weight polymeric condensation product of diphenylolpropane with epichlorohydrin, said condensation product having an epoxide content of at least 7.5% by weight and a melting point not exceeding 75° C. and a Gardner viscosity not exceeding 1.65 poises as a 40% solution in ethylene glycol monobutyl ether, and from 0.5% to 2.0% by weight of said copolymer and condensation product jointly, of a quaternary ammonium hydroxide having at least one alkyl group of from 12 to 18 carbon atoms attached to its nitrogen atom.

3. A coating composition comprising essentially a linear thermoplastic copolymer of 42 parts of styrene and 50 parts of ethyl acrylate and 8 parts of acrylic acid, in admixture with 35 parts of a low molecular weight polymeric condensation product of diphenylolpropane with epichlorohydrin, said condensation product having an epoxide content of at least 7.5% by weight and a melting point not exceeding 75° C. and a Gardner viscosity not exceeding 1.65 poises as a 40% solution in ethylene glycol monobutyl ether, and from 0.5% to 2.0%, by weight of said copolymer and condensation product jointly, of a quaternary ammonium hydroxide having at least one alkyl group of from 12 to 18 carbon atoms attached to its nitrogen atom.

4. A coating composition comprising essentially a linear thermoplastic copolymer of 42 parts of styrene and 50 parts of ethyl acrylate and 8 parts of acrylic acid, in admixture with 35 parts of a low molecular weight polymeric condensation product of diphenylolpropane with epichlorohydrin, said condensation product having an epoxide content of at least 7.5% by weight and a melting point not exceeding 75° C. and a Gardner viscosity not exceeding 1.65 poises as a 40% solution in ethylene glycol monobutyl ether, and from 0.5% to 2.0%, by weight of said copolymer and condensation product jointly, of dodecyl trimethyl ammonium hydroxide.

References Cited in the file of this patent
UNITED STATES PATENTS

| | | |
|---|---|---|
| 2,444,333 | Castan | June 29, 1948 |
| 2,604,464 | Segall et al. | July 22, 1952 |